United States Patent
Kung et al.

(10) Patent No.: US 7,575,340 B2
(45) Date of Patent: Aug. 18, 2009

(54) LIGHT-EMITTING DIODE LIGHT SOURCE SYSTEM

(75) Inventors: Chien-Ping Kung, Miao Li County (TW); Tzeng-Ke Shiau, Miao Li County (TW)

(73) Assignee: Young Lighting Technology Corporation, Hsin-Chu (TW)

( * ) Notice: Subject to any disclaimer, the term of this patent is extended or adjusted under 35 U.S.C. 154(b) by 139 days.

(21) Appl. No.: 11/716,937

(22) Filed: Mar. 12, 2007

(65) Prior Publication Data

US 2007/0253197 A1 Nov. 1, 2007

(30) Foreign Application Priority Data

May 1, 2006 (TW) ................. 95115458 A

(51) Int. Cl.
*F21V 9/00* (2006.01)
*F21V 11/00* (2006.01)
*F21V 5/00* (2006.01)

(52) U.S. Cl. .................. 362/231; 362/237; 362/244; 362/293; 362/339; 362/800

(58) Field of Classification Search .......... 362/231, 362/237, 244, 293, 339, 800
See application file for complete search history.

(56) References Cited

U.S. PATENT DOCUMENTS 6,547,421 B2 * 4/2003 Sugano ................ 362/268

6,769,772 B2 * 8/2004 Roddy et al. ............... 353/31
7,325,956 B2 * 2/2008 Morejon et al. ........... 362/555
2003/0133080 A1 7/2003 Ogawa et al.
2005/0162849 A1 7/2005 Keuper

FOREIGN PATENT DOCUMENTS

TW 200402594 10/1992
TW 200426491 5/1993

* cited by examiner

*Primary Examiner*—Sharon E Payne
*Assistant Examiner*—Sean P Gramling
(74) *Attorney, Agent, or Firm*—Frommer Lawrence & Haug LLP; Ronald R. Santucci

(57) ABSTRACT

A light-emitting diode light source system includes a plurality of light-emitting diode modules for providing light beams; a light-combining unit including a plurality of light incident sides and a light emerging side, the light beams from the light-emitting diode modules entering the light-combining unit via the light incident sides, respectively, and emerging out of the light-combining unit via the light emerging side; a plurality of primary lens units disposed between the light-emitting diode modules and the light incident sides, respectively; a secondary lens unit disposed to confront the light emerging side; and a focusing lens disposed adjacent to the secondary lens unit, the secondary lens unit being disposed between the light-combining unit and the focusing lens, the light beams from the light-emitting diode modules passing through the primary lens units, the light-combining unit, the secondary lens unit and the focusing lens to be projected onto a light valve.

16 Claims, 8 Drawing Sheets

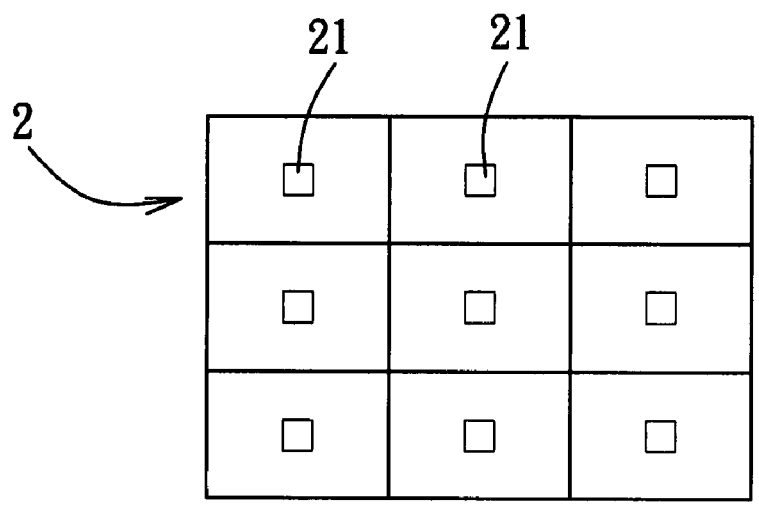
F I G. 7
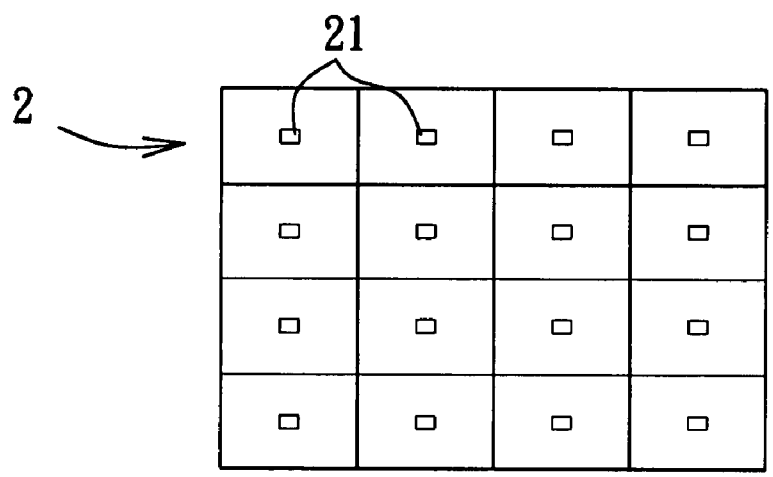
F I G. 8 under this the US 7,575,340 B2

LIGHT-EMITTING DIODE LIGHT SOURCE SYSTEM

CROSS-REFERENCE TO RELATED APPLICATION

This application claims priority of Taiwanese Application No. 095115458, filed on May 1, 2006.

BACKGROUND OF THE INVENTION

1. Field of the Invention

The invention relates to a light source system, more particularly to a light-emitting diode light source system.

2. Description of the Related Art

As shown in FIG. 1 and FIG. 2, an optical engine in a conventional projector normally uses a gas discharge lamp 11 as its light source for optical projection. There are two kinds of reflectors for the gas discharge lamp 11, i.e., a parabolic reflector 12 (as shown in FIG. 1) and an elliptical reflector 12' (as shown in FIG. 2). The reflector 12, 12' directs light beams generated by the gas discharge lamp 11 toward an optical system. The optical system can include an array of lenses 13 (as shown in FIG. 1), or can include an assembly of a color wheel 18 and an integration rod 14 (as shown in FIG. 2). The optical system filters, homogenizes and focuses the source light provided by the gas discharge lamp 11 toward a light valve 15. Eventually, the light valve 15 converts the light beams into an image light output, which is then projected onto a screen (not shown) via a projection lens (not shown). However, the gas discharge lamp 11 is not only expensive and has a short service life (approximately 3,000 to 10,000 hours), but the gas discharge lamp 11 also emits ultraviolet light when generating the source light, such that it is required that the gas discharge lamp 11 be isolated from other components to avoid damage due to the ultraviolet light. In addition, the gas discharge lamp 11 does not comply with the environmental friendly "green product" standard because it contains mercury.

Since the light-emitting diode (LED) has a long service life, which can reach up to 100,000 hours, is environmental friendly (does not contain mercury), and has a good color rendering property, etc., light sources utilizing LEDs are also available. As shown in FIG. 3, a plurality of LEDs 16 are packaged onto a substrate 17, and are used with an integration rod 19 and a lens unit 10 of an optical system. Light beams provided by the LEDs 16 enter a light incident side of the integration rod 19 to be homogenized by the integration rod 19. The light beams emerge out of a light exit side of the integration rod 19, pass through the lens unit 10, and propagate toward a light valve 15. However, the light incident side of the integration rod 19 is often relatively small, such that only a portion of the light beams provided by approximately three or four LEDs 16 is able to enter the integration rod 19 through the light incident side. Therefore, the luminance of the whole optical system is limited by the capacity of the integration rod 19. In other words, even if the total number of LEDs 16 is increased, usable light is still limited due to the limited luminous flux of the optical system. As a result, increasing the number of LEDs 16 would not increase the luminance of the system, but is also a waste of energy and cost. In addition, since the LEDs 16 need to be concentrated near the light incident side of the integration rod 19 in order to allow a maximum amount of light beams to enter the integration rod 19, dissipation of heat energy generated by the LEDs 16 is difficult, thereby adversely affecting illuminating efficiency of the LEDs 16. Therefore, how to improve the optical utilization efficiency of the LEDs 16, and how to increase the luminance of the optical system are major issues in the relevant field.

SUMMARY OF THE INVENTION

Therefore, the object of the present invention is to provide an environmental friendly light-emitting diode light source system with improved service life and enhanced illuminating efficiency as compared to the prior art.

According to one aspect of the present invention, a light-emitting diode light source system is provided and includes a plurality of light-emitting diode modules, a light-combining unit, a plurality of primary lens units, a secondary lens unit, and a focusing lens unit. The light-emitting diode modules provide light beams. The light-combining unit includes a plurality of light incident sides and a light emerging side. The light beams from the light-emitting diode modules enter the light-combining unit via the light incident sides, respectively, and emerge out of the light-combining unit via the light emerging side. The primary lens units are disposed between the light-emitting diode modules and the light incident sides, respectively. The secondary lens unit is disposed to confront the light emerging side. The focusing lens unit is disposed adjacent to the secondary lens unit. The secondary lens unit is disposed between the light-combining unit and the focusing lens unit. The light beams from the light-emitting diode modules pass through the primary lens units, the light-combining unit, the secondary lens unit and the focusing lens unit to be projected onto a light valve.

According to another aspect of the present invention, a light-emitting diode light source system is provided and includes a plurality of light-emitting diode modules, a light-combining unit, a light-homogenizing device, and a focusing lens unit. The light-emitting diode modules provide light beams. The light-combining unit includes a plurality of light incident sides and a light emerging side. The light beams from the light-emitting diode modules enter the light-combining unit via the light incident sides, respectively, and emerge out of the light-combining unit via the light emerging side. The light-homogenizing device includes primary and secondary lens units. The primary lens unit is disposed between the light emerging side and the secondary lens unit. The focusing lens unit is disposed adjacent to the secondary lens unit. The light beams from the light-emitting diode modules pass through the light-combining unit, the primary lens unit, the secondary lens unit and the focusing lens unit to be projected onto a light valve.

BRIEF DESCRIPTION OF THE DRAWINGS

Other features and advantages of the present invention will become apparent in the following detailed description of the preferred embodiments with reference to the accompanying drawings, of which:

FIG. 7 and FIG. 8 are schematic diagrams illustrating the relationship between total number and individual length of light-emitting diodes;

DETAILED DESCRIPTION OF THE PREFERRED EMBODIMENTS

Figure 1:
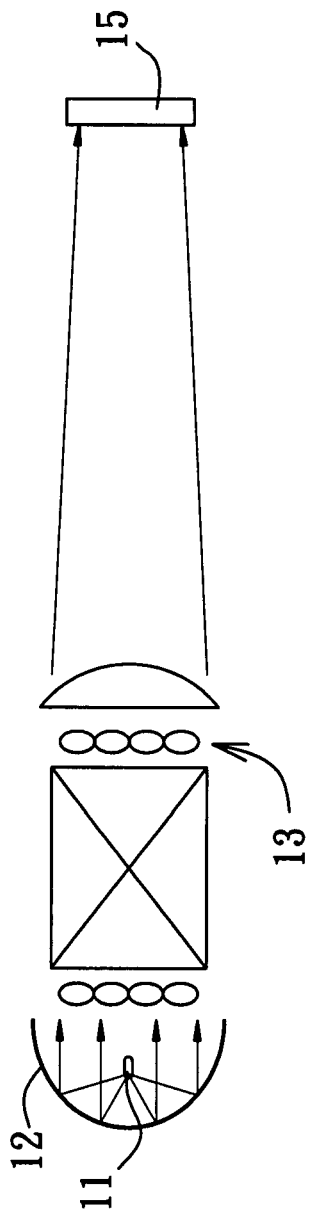
FIG. 1 is a schematic diagram of a conventional optical system with a gas discharge lamp light source.
Figure 2:
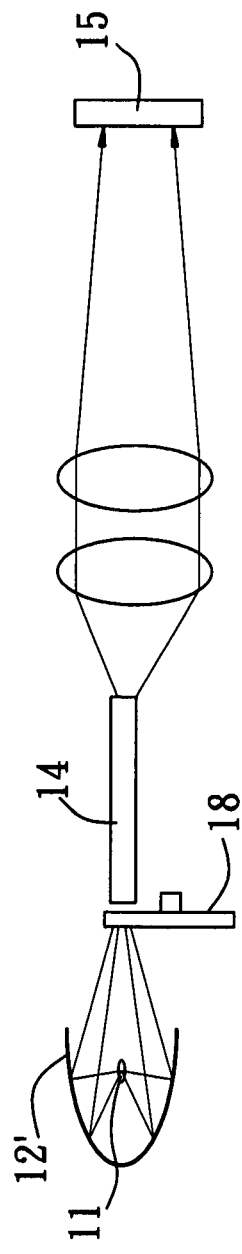
FIG. 2 is a schematic diagram of another conventional optical system with a gas discharge lamp light source.
Figure 3:
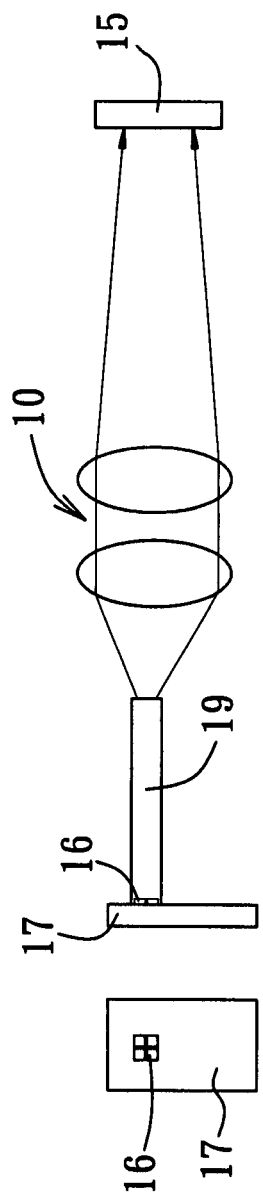
FIG. 3 is a schematic diagram of yet another conventional optical system with a light-emitting diode light source.

Before the present invention is described in greater detail, it should be noted herein that like elements are denoted by the same reference numerals throughout the disclosure.

Figure 4:
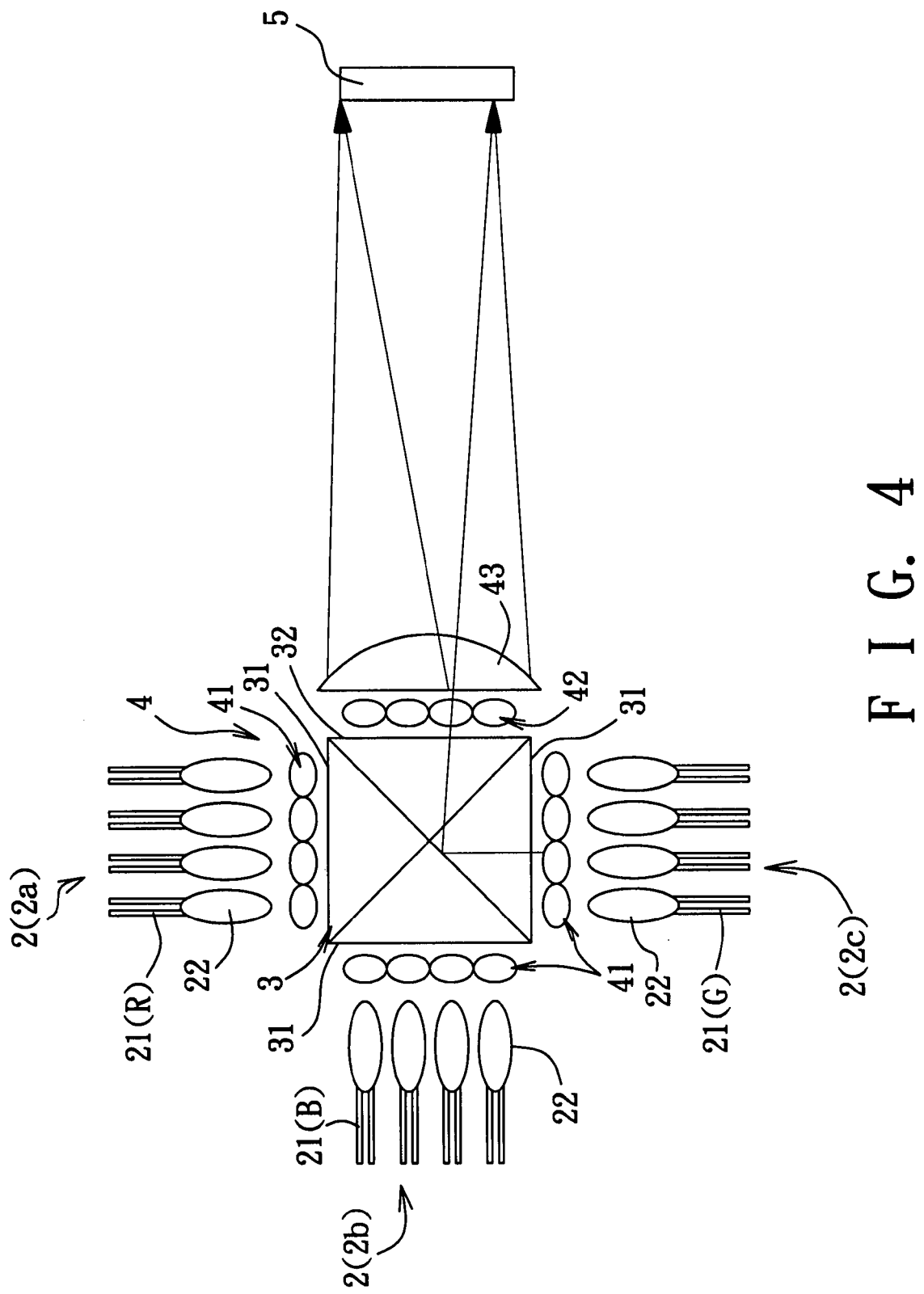
FIG. 4 is a schematic diagram of the first preferred embodiment of a light-emitting diode light source system according to the present invention.

As shown in FIG. 4, the first preferred embodiment of a light-emitting diode light source system according to the present invention includes a plurality of light-emitting diode modules 2, a light-combining unit 3, a light-homogenizing device 4, and a focusing lens unit 43. The light-homogenizing device 4 includes a plurality of primary lens units 41 and a secondary lens unit 42.

Three light-emitting diode modules 2 are used in this embodiment for illustrative purposes. Each of the light-emitting diode modules 2 includes an array of light-emitting diodes 21, and a plurality of diode lens caps 22 coupled to the light-emitting diodes 21, respectively. The light-emitting diode modules 2 include a red light-emitting diode module (2a) capable of providing red light beams, a blue light-emitting diode module (2b) capable of providing blue light beams, and a green light-emitting diode module (2c) capable of providing green light beams. In particular, the red light-emitting diode module (2a) includes an array of red light-emitting diodes (R), the blue light-emitting diode module (2b) includes an array of blue light-emitting diodes (B), and the green light-emitting diode module (2c) includes an array of green light-emitting diodes (G). The diode lens caps 22 are highly directional lenses for collimating the light beams provided by the light-emitting diodes 21 such that the light beams emerges out of the light-emitting diode modules 2 as collimated light beams.

The light-combining unit 3 includes a plurality of light incident sides 31, and a light emerging side 32. The light beams from the light-emitting diode modules 2 enter the light-combining unit 3 via the light incident sides 31, respectively, are combined by the light-combing unit 3, and emerge out of the light-combining unit 3 via said light emerging side 32. In this embodiment, the light-combining unit 3 is a light-combining prism, such as an X-cube prism, that includes three of the light incident sides 31, each of which is disposed to confront a respective one of the red, blue and green light-emitting diode modules (2a, 2b, 2c). It should be noted herein that since light-combining prisms are known in the art, further details of the same are omitted herein for the sake of brevity.

The primary lens units 41 are disposed between the light-emitting diode modules 2 and the light incident sides 31, respectively. In this embodiment, the light-homogenizing lens device 4 includes three of the primary lens units 41, each of which is disposed between a corresponding one of the light incident sides 31 and a corresponding one of the red, blue and green light-emitting diode modules (2a, 2b, 2c) so as to homogenize the light beams from the corresponding one of the red, blue and green light-emitting diode module (2a, 2b, 2c) before the light beams enter into the light-combining unit 3 to be combined. The secondary lens unit 42 is disposed to confront the light emerging side 32. In this embodiment, each of the primary and secondary lens units 41, 42 is a lens array. The primary and secondary lens units 41, 42 are disposed symmetrically about the light-combining unit 3.

The focusing lens unit 43 is disposed adjacent to the secondary lens unit 42. The secondary lens unit 42 is disposed between the light-combining unit 3 and the focusing lens unit 43. The light beams from the light-emitting diode modules 2 pass through the primary lens units 41, the light-combining unit 3, the secondary lens unit 42, and the focusing lens unit so as to be projected onto a light valve 5. In this embodiment, the focusing lens unit 43 is a condenser lens.

The red, blue and green light beams provided by the red, blue and green light-emitting diode modules (2a, 2b, 2c) first propagate through the primary lens units 41, and then enter the light-combining unit 3 via the respective one of the light incident sides 31. In the light-combining unit 3, one of the red, blue and green light beams travels directly therethrough, while the other two change direction such that the red, blue and green light beams so as to be combined. After being combined, the light beams emerge out of the light-combining unit 3 via the light emerging side 32 and propagate toward the secondary lens unit 42 to be homogenized once again thereby. The primary and secondary lens units 41, 42 cooperate to perform light homogenization, and the focusing lens unit 43 is used to focus the light beams after the light beams have been homogenized. Since these three components should be widely known to those skilled in the art, the operating principles of the same are omitted herein for the sake of brevity. Lastly, after being focused, the light beams are projected onto the light valve 5. According to various designs, a reflector or a total internal reflection (TIR) prism can be disposed between the light valve 5 and the focusing lens unit 43.

Explained hereinbelow are detailed descriptions on a relationship between total number of light-emitting diodes 21 and size of each of the light-emitting diodes 21 for providing optimal illumination efficiency in the light-emitting diode light source system of this invention.

Figure 5:
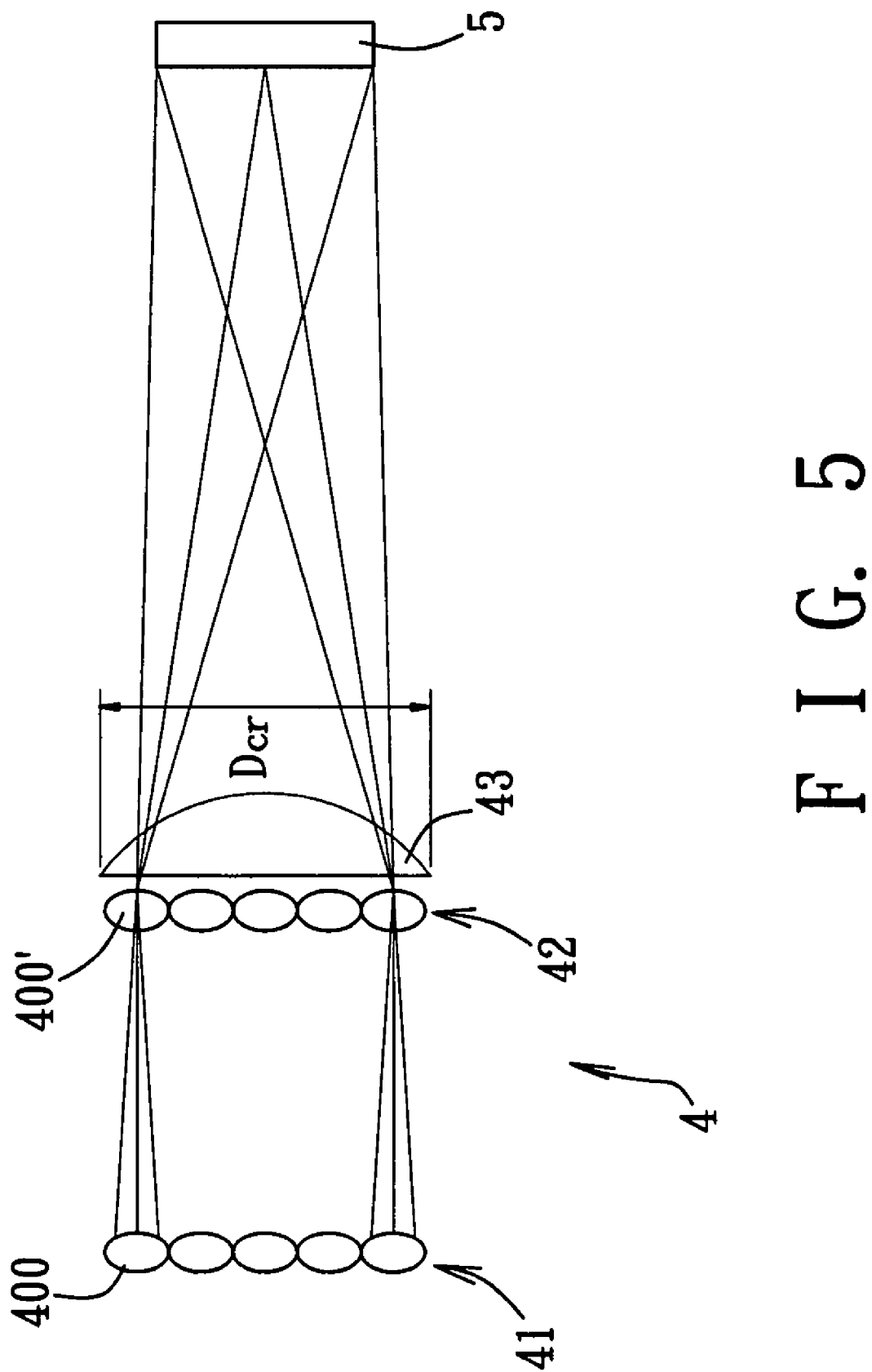
FIG. 5 is a schematic diagram, illustrating primary and secondary lens units of the first preferred embodiment.
Figure 6:
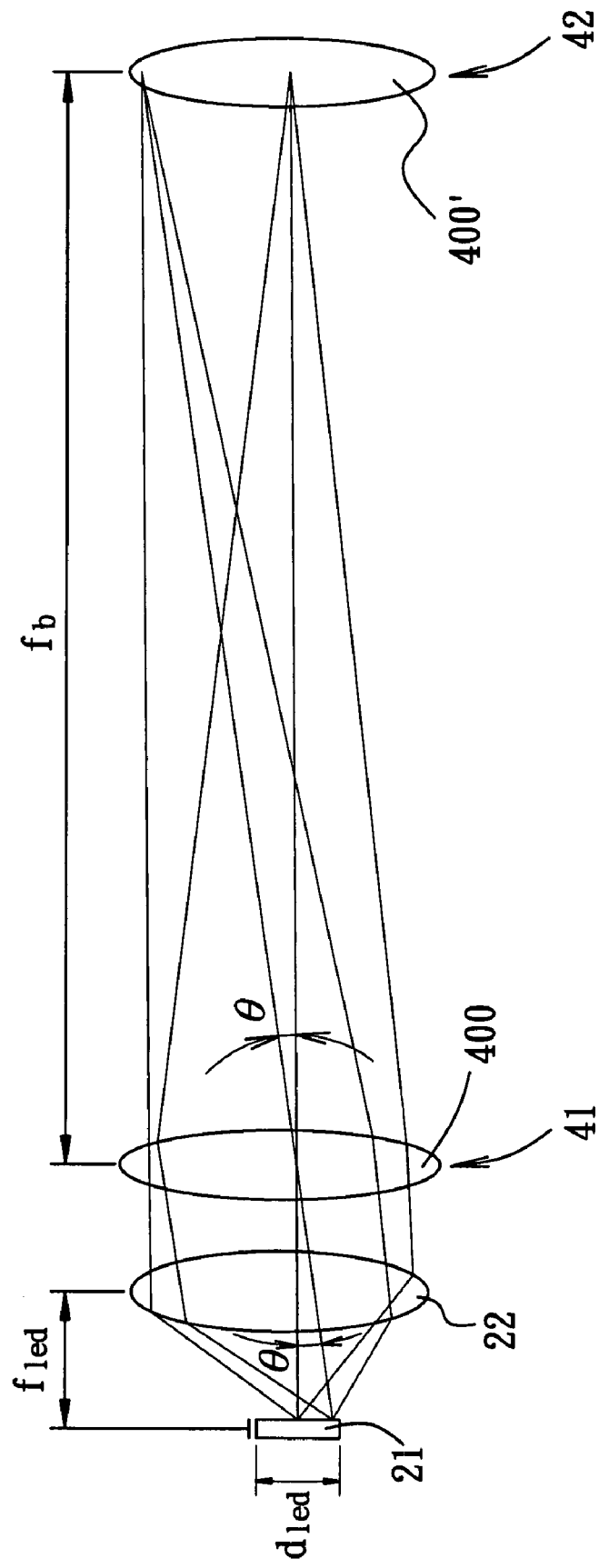
FIG. 6 is a fragmentary schematic diagram, illustrating a light-emitting diode, a diode lens cap, and the primary and secondary lens units of the first preferred embodiment.

Referring to FIG. 5 and FIG. 6, each of the primary lens units 41 and the secondary lens unit 42 is a lens array that includes a plurality of convex lenses 400, 400'. Defining the focal length of each of the convex lenses 400, 400' to be ($f_b$), and the focal length of the focusing lens unit 43 to be ($f_{cr}$), it follows that:

$$m = f_{cr}/f_b \quad \text{(Equation 1)}$$

where (m) is a magnification factor.

$$F_S = f_{cr}/D_{cr} \quad \text{(Equation 2)}$$

where ($D_{cr}$) is the diameter of the focusing lens unit 43, and ($F_S$) is the aperture of the focusing lens unit 43. By combining Equation 1 and Equation 2, the following Equation 3 is obtained:

$$F_S \times D_{cr} = f_{cr} = m \times f_b \quad \text{(Equation 3)}$$

Further defining the diagonal length of the light valve 5 to be ($D_{DMD}$), and the length of each of the convex lenses 400, 400' to be ($l_{lens}$), the magnification factor (m)=$D_{DMD}/l_{lens}$, and substituting the same into Equation 3, the following Equation 4 is obtained:

$$F_S \times D_{cr} = (D_{DMD}/l_{lens}) \times f_b \quad \text{(Equation 4)}$$

Referring to FIG. 6, the convex lens 400 of the primary lens unit 41 is spaced apart from the convex lens 400' of the secondary lens unit 42 by the focal length ($f_b$) of the convex lens 400. In other words, the convex lens 400 of the primary lens unit 41 is disposed at the focal point of the convex lens 400' of the secondary lens unit 42. Therefore, the light beams emerging from the convex lens 400 of the primary unit 41 enter the convex lens 400' of the secondary unit 42 with an even distribution. When the light-emitting diode 21 shifts relative to the convex lens 400 of the primary unit 41 such that the light beams provided by the light-emitting diode 21 form an angle θ (hereinafter refer to as the shift angle θ) with an axis of the convex lens 400 of the primary unit 41, the light beams combined and emerging out of the light-combining unit 3 enter the convex lens 400' of the secondary lens unit 42. With the above in mind, it holds that:

$$l_{lens} = 2 \times f_b \times \tan(\theta) \quad \text{(Equation 5)}$$

By combining Equation 4 and Equation 5, the following Equation 6 is obtained:

$$F_S \times D_{cr} = (D_{DMD})/(2 \times \tan(\theta)) \quad \text{(Equation 6)}$$

Rearranging, the following Equation 7 is obtained:

$$\tan(\theta) = (D_{DMD})/(2 D_{cr} \times F_S) \quad \text{(Equation 7)}$$

Further, the light-emitting diode 21 is disposed at the focal point of the diode lens cap 22. In other words, the distance between the light-emitting diode 21 and the lens cap 22 is equal to the focal length ($f_{led}$) of the diode lens cap 22 such that the light beams provided by the light-emitting diode 21 enter the diode lens cap 22 evenly.

$$\tan(\theta) = (d_{led}/2)/f_{led} = d_{led}/2 f_{led} \quad \text{(Equation 8)}$$

where ($d_{led}$) is the diagonal length of the light-emitting diode 21, ($f_{led}$) is the focal length of the diode lens cap 22, and θ is the shift angle. By rearranging Equation 8, it is obtained that the diagonal length ($d_{led}$) of the light-emitting diode 21 is equal to $2 f_{led} \tan(\theta)$. By equating Equation 7 and Equation 8, the following Equation 9 is obtained:

$$(D_{DMD})/(2 D_{cr} \times F_S) = d_{led}/2 f_{led} \quad \text{(Equation 9)}$$

Simplifying Equation 9, it is obtained that:

$$(D_{DMD})/(D_{cr} \times F_S) = d_{led}/f_{led} \quad \text{(Equation 10)}$$

Referring to FIG. 5 and FIG. 7, the array of light-emitting diodes 21 includes a number (n) of light-emitting diodes 21 aligned in a diagonal direction. Since $D_{cr} = n \times l_{led}$, substituting this into Equation 10, the following Equation 11 is obtained:

$$(D_{DMD})/(n \times l_{led} \times F_S) = d_{led}/f_{led} \quad \text{(Equation 11)}$$

where ($l_{led}$) is the length of each of the diode lens caps 22. Further rearranging Equation 11, the following Equation 12 is obtained:

$$(D_{DMD})/(n \times F_S) = d_{led} \times l_{led}/f_{led} \quad \text{(Equation 12)}$$

where the aperture ($F_{led}$) of each of the diode lens caps 22 is:

$$F_{led} = f_{led}/l_{led} \quad \text{(Equation 13)}$$

By substituting Equation 13 into Equation 12, the following Equation 14 is obtained:

$$(D_{DMD})/(n \times F_S) = d_{led}/F_{led} \quad \text{(Equation 14)}$$

Rearranging Equation 14, it is obtained that:

$$n \times d_{led} = D_{DMD} \times F_{led}/F_S \quad \text{(Equation 15)}$$

As can be seen from Equation 15, when values of the diagonal length ($D_{DMD}$) of the light valve 5, the aperture ($F_{led}$) of each of the diode lens caps 22, and the aperture ($F_S$) of the focusing lens unit 43 are known in the system, the following Equation 16 is obtained:

$$n \times d_{led} = \text{constant} \quad \text{(Equation 16)}$$

In other words, $n \times d_{led}$ is equal to a constant that is determined by the diagonal length ($D_{DMD}$) of the light valve 5, the aperture ($F_{led}$) of each of the diode lens caps 22, and the aperture ($F_S$) of the focusing lens unit 43.

Therefore, the number (n) of light-emitting diodes 21 along the diagonal direction of the array of light-emitting diodes 21 is inversely proportional to the diagonal length ($d_{led}$) of each of the light-emitting diodes 21, i.e., when the number (n) decreases, the diagonal length ($d_{led}$) increases (as shown in FIG. 7), and when the number (n) increases, the diagonal length ($d_{led}$) decreases (as shown in FIG. 8). However, when the number (n) obtained using Equation 16 is not an integer, then the number (n) of the light-emitting diodes 21 is rounded to the nearest integer. Preferably, the number (n) is rounded up to the next whole number.

Therefore, designers can determine the number of light-emitting diodes 21 to include in an array according to the size of each of the light-emitting diodes 21 used, which is proportional to the luminance efficiency of the light-emitting diode 21, so as to ensure optimal illuminating efficiency of the light-emitting diode light source system.

Shown in the following Table 1 are exemplary data obtained using Equation 15, where two different sizes of light valves 5 are used with diagonal lengths ($D_{DMD}$) of 0.55" (i.e., 13.97 mm) and 0.85" (i.e., 21.59 mm), respectively, and where the unit for ($d_{led}$) is mm.

TABLE 1

| $F_S$ | $F_{led}$ | $D_{DMD}$ | constant | $d_{led}$ | n | $n^2$ | Luminance of each green LED (lumen) | Total luminance of green LEDs |
| --- | --- | --- | --- | --- | --- | --- | --- | --- |
| 2.4 | 0.5 | 13.97 | 2.9 | 1.0 | 3 | 9 | | |
| 2.4 | 0.5 | 13.97 | 2.9 | 0.7 | 4 | 16 | | |
| 2.4 | 0.5 | 13.97 | 2.9 | 0.6 | 5 | 25 | | |
| 2.4 | 0.5 | 21.59 | 4.5 | 1.5 | 3 | 9 | 53.95 | 485.55 |
| 2.4 | 0.5 | 21.59 | 4.5 | 1.1 | 4 | 16 | | |
| 2.4 | 0.5 | 21.59 | 4.5 | 0.9 | 5 | 25 | | |
| 2.4 | 0.5 | 21.59 | 4.5 | 0.7 | 6 | 36 | | |

As shown in Table 1, when $F_S=2.4$, $F_{led}=0.5$, $D_{DMD}=0.85"$, the constant is equal to 4.5. Using high-power light-emitting diodes 21, each having an illuminating area of 0.9 mm×1.2 mm and a diagonal length ($d_{led}$) of 1.5 mm, the number (n) that is approximately equal to 3 is obtained. Therefore, assuming that the array of light-emitting diodes 21 is an (n) by (n) array, the array would include nine (3×3=9) light-emitting diodes 21. Electric current of each 0.9 mm×1.2 mm green light-emitting diode (G) (as shown in FIG. 4) is approximately 350 mA, and positive phase voltage is 3.5V. Therefore, for each Watt of power, approximately 54 lumens of luminance are achieved by a single 0.9 mm×1.2 mm green light-emitting diode (G). For nine green light-emitting diodes (G), approximately 485 lumens of luminance can be achieved. Since luminance of green light beams takes up approximately 60% of the total luminance of white light, the combined luminance generated by the arrays of red, blue and green light-emitting diodes (R), (B), (G) (as shown in FIG. 4) is approximately equal to 800 lumens. With a system light transmission rate of approximately 17.5%, the light beams exiting the secondary lens units 42 of the light-homogenizing device 4 has approximately 140 lumens of luminance.

It should be noted herein that if $n \times d_{led} \geq$ constant, then the luminance of the light-emitting diode light source system can reach the maximum value, but some extra energy of the light-emitting diodes 21 would be wasted. On the other hand, if $n \times d_{led} \leq$ constant, then the luminance of the light-emitting diode light source system would not reach the maximum value, and the system might not be bright enough for its application. It should be understood by those skilled in the art that slightly bigger or smaller constants can be used to determine the number (n) and the diagonal length ($d_{led}$) of the light-emitting diodes 21, and would still lie within the scope of the present invention.

In sum, the illuminating efficiency of the light-emitting diode light source system is optimized by using the relationship $n \times d_{led} = D_{DMD} \times F_{led}/F_S$ (Equation 15), and by letting the diagonal length ($D_{DMD}$) of the light valve 5, the aperture ($F_{led}$) of each of the diode lens caps 22, and the aperture ($F_S$) of the focusing lens unit 43 determine the constant in $n \times d_{led}$=constant (Equation 16), where (n) and ($d_{led}$) are inversely proportional to each other. As compared to the prior art, the light-emitting diode light source system of the present invention eliminates the occurrence of insufficient luminance or waste of light energy.

The present invention increases the luminance of the system significantly, compared to approximately only 15 lumens of luminance in the prior art. In addition, the arrays of the red, blue and green light-emitting diodes (R), (B), (G) are spaced apart from each other such that good heat dissipation is provided, which in turn helps maintain the luminance of the light-emitting diodes 21. Therefore, adverse effect in the illuminating efficiency of the system due to accumulation of heat energy in the light-emitting diodes 21 is prevented in the present invention. Further, if smaller-sized light-emitting diodes 21 are used, the total number of light-emitting diodes 21 in the array can be increased to increase the luminance of the system. Moreover, Equations 1 to 16 provided hereinabove can be used along with other general knowledge in the field to search for light-emitting diodes 21 with ideal sizes that can optimize the illuminating efficiency of the system.

Figure 9:
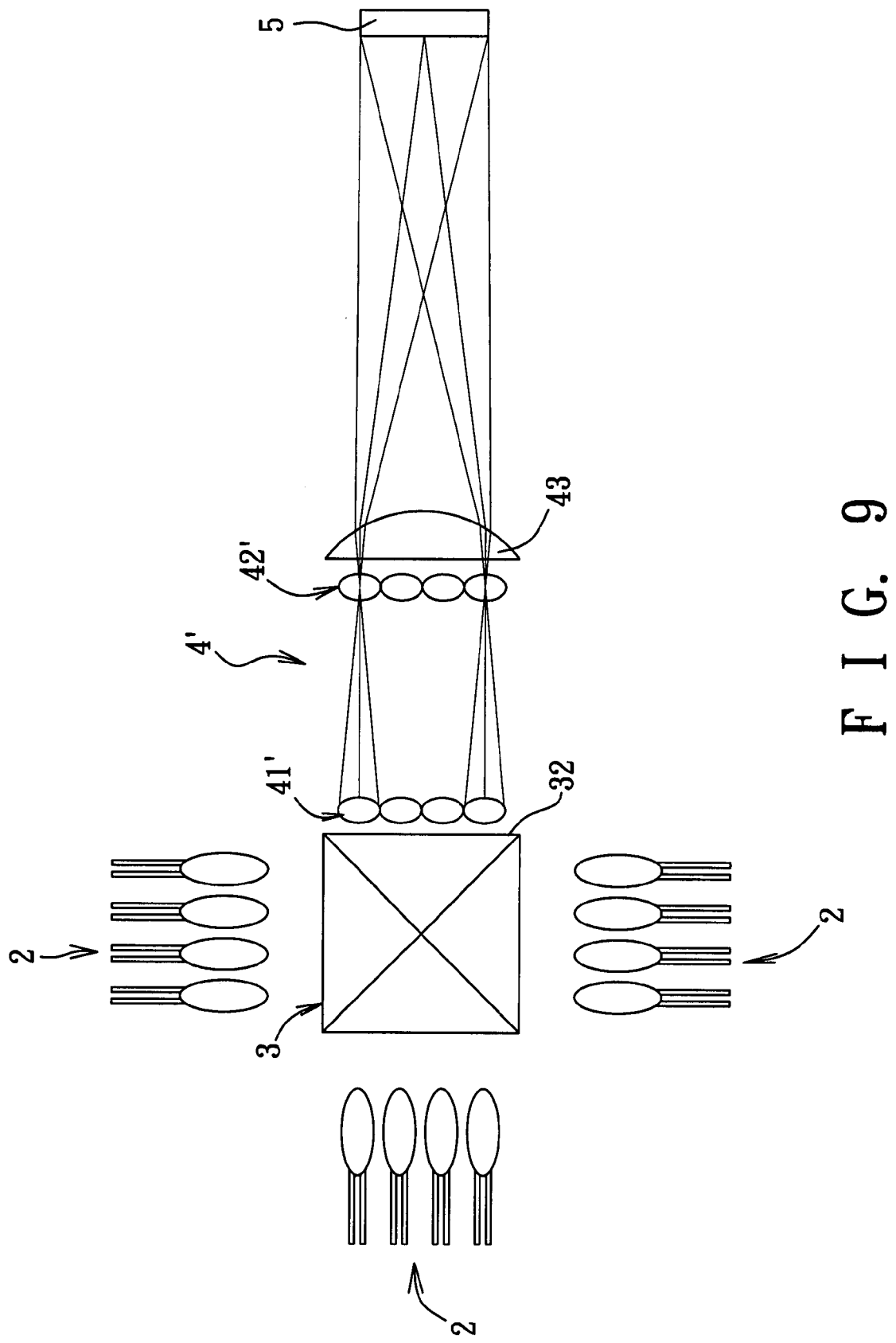
FIG. 9 is a schematic diagram of the second preferred embodiment of a light-emitting diode light source system according to the present invention.

As shown in FIG. 9, the second preferred embodiment of a light-emitting diode light source system according to the present invention also includes a plurality of light-emitting diode modules 2, a light-combining unit 3, a light-homogenizing device 4', and a focusing lens unit 43. The light-homogenizing device 4' includes a primary lens unit 41' and a secondary lens unit 42'.

The second preferred embodiment differs from the first preferred embodiment in that there is only one primary lens unit 41', as opposed to three in the first embodiment. The primary lens unit 41' is disposed between the light emerging side 32 of the light-combining unit 3 and the secondary lens unit 42'. In other words, the primary and secondary lens units 41', 42', and the focusing lens unit 43 are aligned sequentially in a direction from the light emerging side 32 of the light-combining unit 3 to the light valve 5. In this embodiment, the light beams provided by the light-emitting diode modules 2 pass through the light-combining unit 3, the primary lens unit 41', the secondary lens unit 42', and the focusing lens unit 43. Although the primary and secondary lens units 41', 42' are disposed at different locations relative to the light-combining unit 3 as compared to the first preferred embodiment, those skilled in the art should know that both embodiments have equal light-homogenizing, light-combining, and light-focusing abilities.

However, since the primary and secondary lens units 41', 42' need to be spaced apart without having the light-combining unit 3 interposed therebetween, the total length of the second preferred embodiment is greater than that of the first preferred embodiment. Nevertheless, since there is only one primary lens unit 41', the number of lenses required for light-homogenizing in the second preferred embodiment is less than that of the first preferred embodiment such that the second preferred embodiment is advantageous in having a reduced cost.

Figure 10:
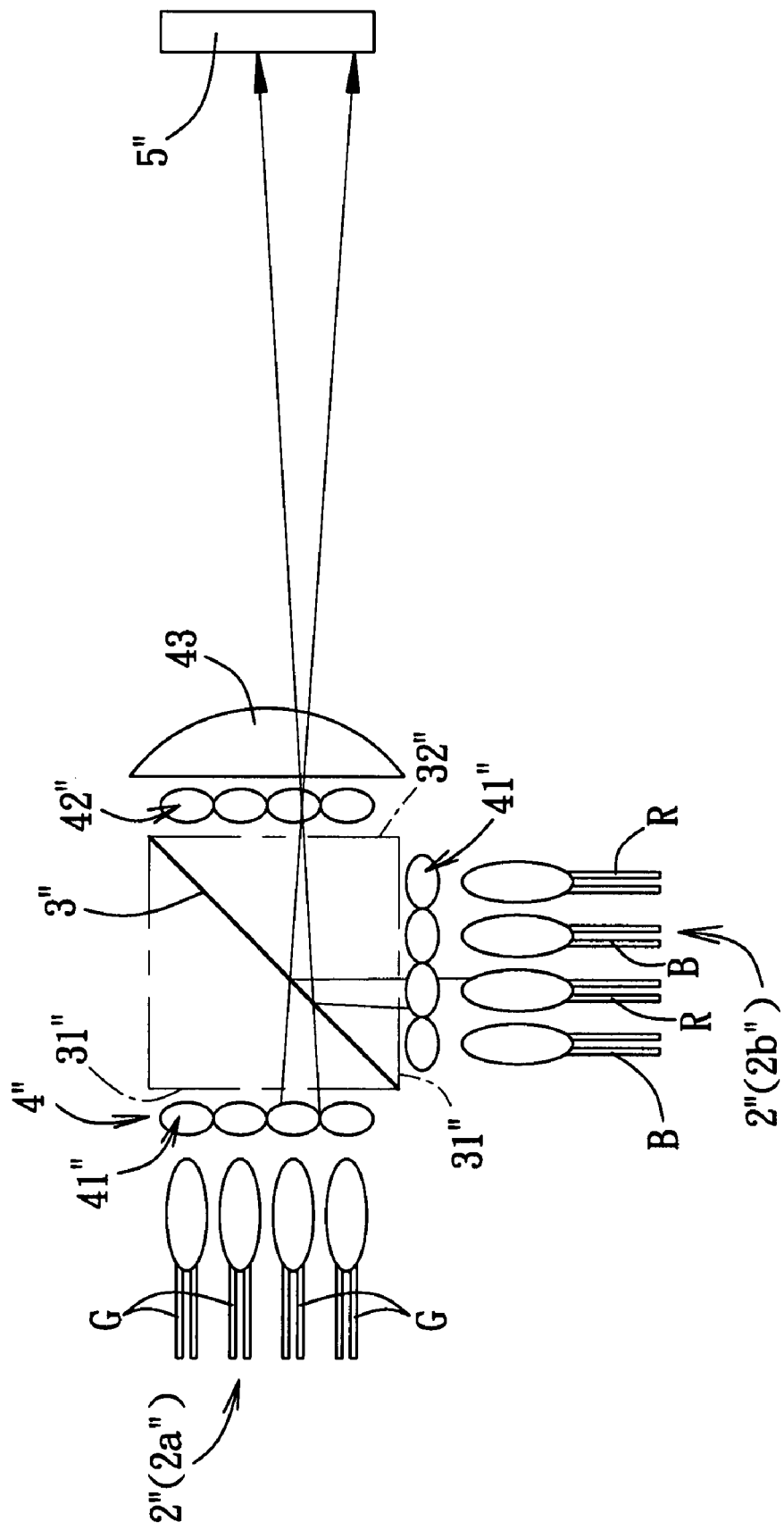
FIG. 10 is a schematic diagram of the third preferred embodiment of a light-emitting diode light source system according to the present invention.

As shown in FIG. 10, the third preferred embodiment of a light-emitting diode light source system according to the present invention differs from the first preferred embodiment in that the light-emitting diode modules 2" include a green light-emitting diode module (2a") capable of providing green light beams, and a red-and-blue light-emitting diode module (2b") capable of providing red and blue light beams. The third preferred embodiment is implemented in this manner because after taking white balance and light-emitting efficiency of presently existing red, blue and green light-emitting diodes (R), (B), (G) into account, the number of green light-emitting diodes (G) required to obtain white balance is greater than those of red and blue light-emitting diodes (R), (B). In particular, the green light-emitting diode module (2a") includes an array of green light-emitting diodes (G). Preferably, the red-and-blue light-emitting diode module (2b") includes an array of red and blue light-emitting diodes (R), (B) that are arranged alternatingly on a plane.

The light-combining unit 3" includes two of the light incident sides 31", each of which is disposed to confront a respective one of the green and red-and-blue light-emitting diode modules (2a", 2b"). In this embodiment, the light-combining unit 3" is a band pass (BP) light filter that permits transmission of the green light beams therethrough, and that reflects the red and blue light beams toward the light emerging side 32" of the light-combining unit 3".

The number of primary lens units 41" corresponds to the number of light-emitting diode modules 2". Therefore, the third preferred embodiment includes two primary lens units 41", each of which is interposed between a respective one of the green and red-and-blue light-emitting diode modules (2a", 2b"), and a respective one of the light incident sides 31" of the light-combining unit 3".

Since this embodiment includes fewer light-emitting diodes 21" and fewer primary lens units 41", and since the band pass light filter is used in place of the light-combining prism, this embodiment has a reduced cost as compared to the first preferred embodiment.

Figure 11:
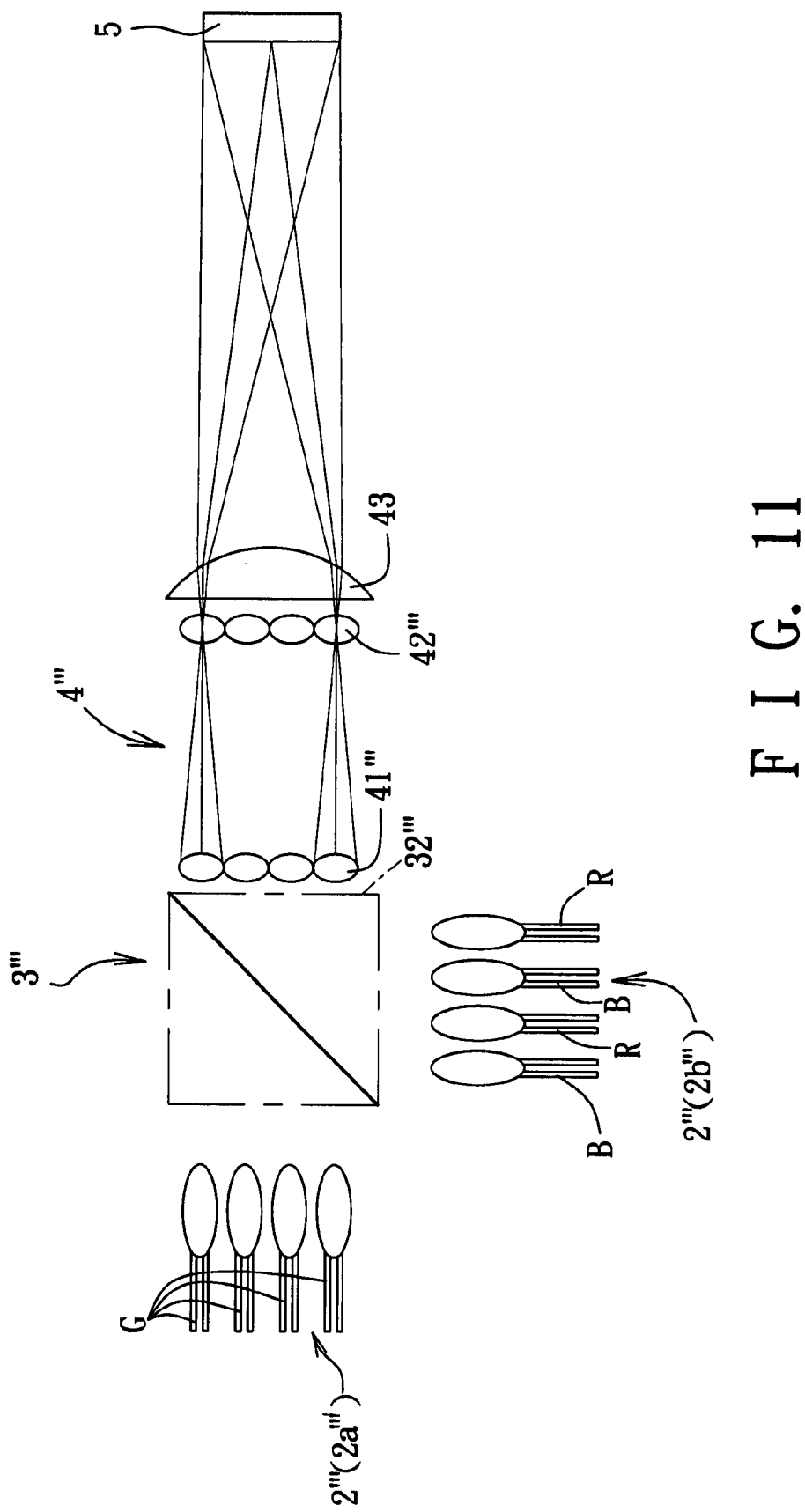
FIG. 11 is a schematic diagram of the fourth preferred embodiment of a light-emitting diode light source system according to the present invention.

As shown in FIG. 11, the fourth preferred embodiment of a light-emitting diode light source system according to the present invention differs from the previous embodiments in that this embodiment is a further modification of the second and third preferred embodiments.

In this embodiment, the light-emitting diode modules 2''' include a green light-emitting diode module (2a''') capable of providing green light beams, and a red-and-blue light-emitting diode module (2b''') capable of providing red and blue light beams. The green light-emitting diode module (2a''') includes an array of green light-emitting diodes (G), while the red-and-blue light-emitting diode module (2b''') includes an array of red and blue light-emitting diodes (R), (B) that are arranged alternatingly on a plane.

The light-combining unit 3''' is a band pass light filter that permits transmission of the green light beams therethrough, and that reflects the red and blue light beams toward a light emerging side 32′′′ thereof. The primary lens unit 41′′′ is interposed between the light emerging side 32′′′ of the light-combining unit 3′′′ and the secondary lens unit 42′′′. In other words, the primary and secondary lens units 41′′′, 42′′′, and the focusing lens unit 43 are aligned sequentially in a direction from the light emerging side 32′′′ of the light-combining unit 3′′′ to the light valve 5.

It should be noted herein that although the detailed deduction for the relationship between the number and size of the light-emitting diodes is only provided in the first preferred embodiment, since the principles behind all four embodiments are the same, Equations 1 to 16 are applicable to all embodiments of the present invention.

In sum, the present invention increases the luminance of the system to approximately 140 lumens, as compared to approximately 15 to 30 lumens in the prior art. In addition, the light-emitting diode modules 2, 2′, 2′′, 2′′′ are spaced apart from each other so that good heat dissipation is provided, which in turn helps maintain luminance of the light-emitting diode modules 2, 2′, 2′′, 2′′′. Moreover, it is also disclosed in the present invention that when the values of the diagonal length ($D_{DMD}$) of the light valve 5, the aperture ($F_{led}$) of each of the diode lens caps 22, and the aperture ($F_S$) of the focusing lens unit 43 are fixed, a certain relationship exists between the number (n) and the diagonal length ($d_{led}$) of the light-emitting diodes 21, where $n \times d_{led} = D_{DMD} \times F_{led}/F_S$ (Equation 15), and therefore $n \times d_{led}$=constant (Equation 16). Consequently, designers can determine the number of light-emitting diodes 21 to include in the system according to the size of each of the light-emitting diodes 21 used such that illuminating efficiency of the light-emitting diode light source system is optimized.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light-emitting diode light source system, comprising:
   a plurality of light-emitting diode modules for providing light beams;
   a light-combining unit including a plurality of light incident sides and a light emerging side, the light beams from said light-emitting diode modules entering said light-combining unit via said light incident sides, respectively, and emerging out of said light-combining unit via said light emerging side;
   a plurality of primary lens units disposed between said light-emitting diode modules and said light incident sides, respectively;
   a secondary lens unit disposed to confront said light emerging side; and
   a focusing lens unit disposed adjacent to said secondary lens unit, said secondary lens unit being disposed between said light-combining unit and said focusing lens unit, the light beams from said light-emitting diode modules passing through said primary lens units, said light-combining unit, said secondary lens unit and said focusing lens unit to be projected onto a light valve,
   wherein each of said light-emitting diode modules includes an array of light-emitting diodes, and a plurality of diode lens caps coupled to said light-emitting diodes, respectively,
   wherein said array of light-emitting diodes includes a number (n) of light-emitting diodes aligned in a diagonal direction, each of said light-emitting diodes has a diagonal length of ($d_{led}$), said focusing lens unit has an aperture of ($F_S$), each of said diode lens caps has an aperture of ($F_{led}$), the light valve has a diagonal length of ($D_{DMD}$), and the following relationship $n \times d_{led} = D_{DMD} \times F_{led}/F_S$ is satisfied.

2. The light-emitting diode light source system as claimed in claim 1, wherein said light-emitting diode modules include a red light-emitting diode module capable of providing red light beams, a blue light-emitting diode module capable of providing blue light beams, and a green light-emitting diode module capable of providing green light beams, said light-combining unit including three of said light incident sides, each of said light incident sides being disposed to confront a respective one of said red, blue and green light-emitting diode modules.

3. The light-emitting diode light source system as claimed in claim 1, wherein each of said primary and secondary light-homogenizing lens units is a lens array.

4. The light-emitting diode light source system as claimed in claim 1, wherein said light-combining unit is a light-combining prism.

5. The light-emitting diode light source system as claimed in claim 1, wherein said light-emitting diode modules include a red-and-blue light-emitting diode module capable of providing red and blue light beams, and a green light-emitting diode module capable of providing green light beams, said light-combining unit including two of said light incident sides, each of said light incident sides being disposed to confront a respective one of said red-and-blue and green light-emitting diode modules.

6. The light-emitting diode light source system as claimed in claim 5, wherein said green light-emitting diode module includes an array of green light-emitting diodes, said red-andblue light-emitting diode module including an array of red and blue light-emitting diodes that are arranged alternatingly on a plane.

7. The light-emitting diode light source system as claimed in claim 5, wherein said light-combining unit is a band pass light filter permitting transmission of the green light beams therethrough, and reflecting the red and blue light beams toward said light emerging side.

8. The light-emitting diode light source system as claimed in claim 1, wherein the number (n) of said light-emitting diodes is rounded to the nearest integer when an actual value of the number (n) that satisfies the relationship $n \times d_{led} = D_{DMD} \times F_{led}/F_S$ is not an integer.

9. A light-emitting diode light source system, comprising:
a plurality of light-emitting diode modules for providing light beams;
a light-combining unit including a plurality of light incident sides and a light emerging side, the light beams from said light-emitting diode modules entering said light-combining unit via said light incident sides, respectively, and emerging out of said light-combining unit via said light emerging side;
a light-homogenizing device including primary and secondary lens units, said primary lens unit being disposed between said light emerging side and said secondary lens unit; and
a focusing lens unit disposed adjacent to said secondary lens unit, the light beams from said light-emitting diode modules passing through said light-combining unit, said primary lens unit, said secondary lens unit and said focusing lens unit to be projected onto a light valve,
wherein each of said light-emitting diode modules includes an array of light-emitting diodes, and a plurality of diode lens caps coupled to said light-emitting diodes, respectively,
wherein said array of light-emitting diodes includes a number (n) of light-emitting diodes aligned in a diagonal direction, each of said light-emitting diodes has a diagonal length of ($d_{led}$), said focusing lens unit has an aperture ($F_S$), each of said diode lens caps has an aperture ($F_{led}$), the light valve has a diagonal length of ($D_{DMD}$), and the following relationship $n \times d_{led} = D_{DMD} \times F_{led}/F_S$ is satisfied.

10. The light-emitting diode light source system as claimed in claim 9, wherein said light-emitting diode modules include a red light-emitting diode module capable of providing red light beams, a blue light-emitting diode module capable of providing blue light beams, and a green light-emitting diode module capable of providing green light beams, said light-combining unit including three of said light incident sides, each of said light incident sides being disposed to confront a respective one of said red, blue and green light-emitting diode modules.

11. The light-emitting diode light source system as claimed in claim 9, wherein each of said primary and secondary light-homogenizing lens units is a lens array.

12. The light-emitting diode light source system as claimed in claim 9, wherein said light-combining unit is a light-combining prism.

13. The light-emitting diode light source system as claimed in claim 9, wherein said light-emitting diode modules include a red-and-blue light-emitting diode module capable of providing red and blue light beams, and a green light-emitting diode module capable of providing green light beams, said light-combining unit including two of said light incident sides, each of said light incident sides being disposed to confront a respective one of said red-and-blue and green light-emitting diode modules.

14. The light-emitting diode light source system as claimed in claim 13, wherein said green light-emitting diode module includes an array of green light-emitting diodes, said red-and-blue light-emitting diode module including an array of red and blue light-emitting diodes that are arranged alternatingly on a plane.

15. The light-emitting diode light source system as claimed in claim 13, wherein said light-combining unit is a band pass light filter permitting transmission of the green light beams therethrough, and that reflects the red and blue light beams toward said light emerging side.

16. The light-emitting diode light source system as claimed in claim 9, wherein the number (n) of said light-emitting diodes is rounded to the nearest integer when an actual value of the number (n) that satisfies the relationship $n \times d_{led} = D_{DMD} \times F_{led}/F_S$ is not an integer.

* * * * *